(12) United States Patent
Wills et al.

(10) Patent No.: US 10,338,955 B1
(45) Date of Patent: *Jul. 2, 2019

(54) SYSTEMS AND METHODS THAT EFFECTUATE TRANSMISSION OF WORKFLOW BETWEEN COMPUTING PLATFORMS

(71) Applicant: GOPRO, INC., San Mateo, CA (US)

(72) Inventors: Jonathan Wills, San Mateo, CA (US); Desmond Chik, San Mateo, CA (US); Daniel Tse, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/458,296

(22) Filed: Mar. 14, 2017

Related U.S. Application Data

(63) Continuation of application No. 14/920,348, filed on Oct. 22, 2015, now Pat. No. 9,639,560.

(51) Int. Cl.
*G06K 9/00* (2006.01)
*G06F 9/48* (2006.01)
(Continued)

(52) U.S. Cl.
CPC .......... *G06F 9/4843* (2013.01); *G06F 9/5005* (2013.01); *G06T 11/60* (2013.01);
(Continued)

(58) Field of Classification Search
None
See application file for complete search history.

(56) References Cited

U.S. PATENT DOCUMENTS 6,633,685 B1 10/2003 Kusama
7,486,817 B2 * 2/2009 Yanagawa ............ H04N 13/305
382/154
(Continued)

FOREIGN PATENT DOCUMENTS

JP H09181966 A 7/1997
JP 2005252459 A 9/2005
(Continued)

OTHER PUBLICATIONS

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
(Continued)

*Primary Examiner* — Feng Niu
(74) *Attorney, Agent, or Firm* — Esplin & Associates, PC

(57) ABSTRACT

A first command may be received from a client computing platform. The first command may include proxy visual content. The proxy visual content may represent visual content stored on the client computing platform. An identifier may be associated with the proxy visual content. The identifier may be transmitted to the client computing platform. The identifier may be associated with the visual content stored on the client computing platform. Edits to the visual content based upon the proxy visual content may be determined at a remote computing platform. Instructions may be transmitted from the remote computing platform to the client computing platform. The instructions may include the identifier. The instructions may be configured to cause the client computing platform to process the edits on the visual content.

20 Claims, 5 Drawing Sheets

(51) Int. Cl.
*H04L 29/08* (2006.01)
*G06T 11/60* (2006.01)
*G06F 9/50* (2006.01)

(52) U.S. Cl.
CPC .......... *H04L 67/2804* (2013.01); *H04L 67/36* (2013.01); *G06T 2210/22* (2013.01)

(56) References Cited

U.S. PATENT DOCUMENTS

| | | |
|---|---|---|
| 7,512,886 B1 | 3/2009 | Herberger |
| 7,885,426 B2 | 2/2011 | Golovchinsky |
| 7,970,240 B1 | 6/2011 | Chao |
| 8,000,521 B2* | 8/2011 | Kira .................... H04N 13/133 382/154 |
| 8,180,161 B2 | 5/2012 | Haseyama |
| 8,457,367 B1* | 6/2013 | Sipe .................. G06K 9/00221 382/118 |
| 8,606,073 B2 | 12/2013 | Woodman |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,142,257 B2 | 9/2015 | Woodman |
| 9,342,376 B2 | 5/2016 | Jain |
| 9,418,283 B1 | 8/2016 | Natarajan |
| 2002/0165721 A1 | 11/2002 | Chang |
| 2004/0001706 A1 | 1/2004 | Jung |
| 2005/0025454 A1 | 2/2005 | Nakamura |
| 2005/0108031 A1 | 5/2005 | Grosvenor |
| 2005/0195478 A1* | 9/2005 | Yanagawa ............ H04N 13/305 359/462 |
| 2005/0198018 A1 | 9/2005 | Shibata |
| 2006/0080286 A1 | 4/2006 | Svendsen |
| 2006/0115108 A1 | 6/2006 | Rodriguez |
| 2006/0158730 A1* | 7/2006 | Kira .................... H04N 13/133 359/462 |
| 2008/0123976 A1 | 5/2008 | Coombs |
| 2008/0183843 A1 | 7/2008 | Gavin |
| 2009/0019995 A1 | 1/2009 | Miyajima |
| 2009/0027499 A1 | 1/2009 | Nicholl |
| 2009/0125559 A1 | 5/2009 | Yoshino |
| 2009/0252474 A1 | 10/2009 | Nashida |
| 2010/0046842 A1 | 2/2010 | Conwell |
| 2010/0086216 A1 | 4/2010 | Lee |
| 2010/0161720 A1 | 6/2010 | Colligan |
| 2010/0199182 A1 | 8/2010 | Lanza |
| 2010/0274714 A1 | 10/2010 | Sims |
| 2010/0316291 A1* | 12/2010 | Deng ................. G06K 7/10544 382/166 |
| 2010/0318660 A1 | 12/2010 | Balsubramanian |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2012/0014673 A1 | 1/2012 | O'Dwyer |
| 2012/0027381 A1 | 2/2012 | Kataoka |
| 2012/0030263 A1 | 2/2012 | John |
| 2012/0141019 A1 | 6/2012 | Zhang |
| 2012/0210205 A1 | 8/2012 | Sherwood |
| 2012/0210228 A1 | 8/2012 | Wang |
| 2012/0246114 A1 | 9/2012 | Edmiston |
| 2012/0283574 A1 | 11/2012 | Park |
| 2013/0182166 A1 | 7/2013 | Shimokawa |
| 2013/0235071 A1 | 9/2013 | Ubillos |
| 2013/0239051 A1 | 9/2013 | Albouze |
| 2013/0330019 A1 | 12/2013 | Kim |
| 2014/0149865 A1 | 5/2014 | Tanaka |
| 2014/0152762 A1 | 6/2014 | Ukil |
| 2014/0192238 A1* | 7/2014 | Attar .................... H04N 5/2226 348/252 |
| 2014/0282661 A1 | 9/2014 | Martin |
| 2015/0039646 A1 | 2/2015 | Sharifi |
| 2015/0071547 A1 | 3/2015 | Keating |
| 2015/0113009 A1 | 4/2015 | Zhou |
| 2015/0156247 A1 | 6/2015 | Hensel |
| 2015/0205992 A1* | 7/2015 | Rowe ................... G06K 9/2018 382/124 |
| 2015/0287435 A1 | 10/2015 | Land |
| 2016/0029105 A1 | 1/2016 | Newman |
| 2016/0094601 A1 | 3/2016 | Besehanic |
| 2016/0103830 A1 | 4/2016 | Cheong |
| 2016/0189752 A1 | 6/2016 | Galant |
| 2016/0196475 A1* | 7/2016 | Martin ............... G06K 9/00906 382/117 |
| 2016/0260000 A1 | 9/2016 | Yamakawa |
| 2016/0286235 A1 | 9/2016 | Yamamoto |
| 2016/0335483 A1* | 11/2016 | Pfursich ............. G06K 9/00899 |
| 2018/0173979 A1* | 6/2018 | Fan .......................... G06K 9/00 |

FOREIGN PATENT DOCUMENTS

| | | | |
|---|---|---|---|
| JP | 2006053694 | | 2/2006 |
| JP | 2006053694 A | | 2/2006 |
| JP | 2008059121 A | | 3/2008 |
| JP | 2009053748 A | | 3/2009 |
| JP | 2011188004 | | 9/2011 |
| JP | 2011188004 A | | 9/2011 |
| WO | 2006001361 A1 | | 1/2006 |
| WO | 2009040538 | | 4/2009 |
| WO | WO-2012005809 A1 * | 1/2012 | ......... G06K 7/10881 |
| WO | 2012057623 | | 5/2012 |
| WO | 2012057623 A1 | | 5/2012 |
| WO | 2012086120 A1 | | 6/2012 |
| WO | WO-2017123702 A1 * | 7/2017 | ............... G06T 7/70 |

OTHER PUBLICATIONS

Japanese Office Action for JP Application No. 2013-140131, dated Aug. 5, 2014, 6 pages.
Office Action for U.S. Appl. No. 13/831,124, dated Mar. 19, 2015, 14 pages.
PSonar URL: http://www.psonar.com/about retrieved on Aug. 24, 2016, 3 pages.
PCT International Search Report and Written Opinion for PCT/US2015/023680, dated Oct. 6, 2015, 13 pages.
PCT International Written Opinion for PCT/US2015/041624, dated Dec. 17, 2015, 7 Pages.
PCT International Search Report for PCT/US15/41624 dated Nov. 4, 2015, 5 pages.
PCT International Search Report for PCT/US15/23680 dated Aug. 3, 2015, 4 pages.
PCT International Preliminary Report on Patentability for PCT/US2015/023680, dated Oct. 4, 2016, 10 pages.
FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding.html>.
PCT International Search Report and Written Opinion for PCT/US15/12086 dated Mar. 17, 2016, 20 pages.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.

(56) References Cited

OTHER PUBLICATIONS

Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.

* cited by examiner

SYSTEMS AND METHODS THAT EFFECTUATE TRANSMISSION OF WORKFLOW BETWEEN COMPUTING PLATFORMS

FIELD

The disclosure relates to systems and methods that effectuate transmission of workflow between computing platforms.

BACKGROUND

Users often take multiple images with a smart device. The images may not have been captured in the most ideal way. For example, the device may have been tilted while capturing an image and/or insufficient lighting may have been available at the time of capturing the image. Users may want to edit and/or enhance the images.

SUMMARY

One aspect of the disclosure relates to a system that effectuates transmission of workflow between computing platforms. The system may receive, from a client computing platform, a first command. The first command may include proxy visual content. The proxy visual content may represent visual content stored on the client computing platform. The proxy visual content may be associated with an identifier which may be transmitted from an application programming interface (API) to the client computing platform. A task may be associated with the proxy visual content. The task may be transmitted from the API to a remote computing platform for processing based upon the proxy visual content. Processing may include determining edits to the visual content based upon the proxy visual content, including an angle to rotate the visual content and/or determining an area to crop the visual content. Instructions including the edits may be transmitted from the remote computing platform to client computing platform via the API, such that the instructions may be applied to the visual content at the client computing platform.

In some implementations, the system may include one or more servers. The server(s) may be configured to communicate with one or more client computing platforms according to a client/server architecture. The users of the system may access the system via the client computing platform. The server(s) may be configured to execute computer readable instructions. Computer readable instructions may include one or more of a first command component, an identifier component, an edits component, an instructions component, and/or other components.

The first command component may be configured to receive a first command from a client computing platform. The first command may be received from the client computing platform. The first command may include proxy visual content. The proxy visual content may represent visual content stored on the client computing platform. The proxy visual content may be stored by the server(s), the client computing platform, and/or other storage locations. The proxy visual content may be a downsample of the visual content stored on the client computing platform, such that the proxy visual content may be a lower resolution visual content than the visual content stored on the client computing platform, may include some but not all of the content in the proxy visual content, and/or be a proxy for the visual content stored on the client computing platform in other ways. The proxy visual content may be generated in such a way to maintain an aspect ratio in relation to the visual content stored on the client computing platform. The first command may include an upload of the proxy visual content via an application programming interface.

The identifier component may be configured to associate an identifier with the proxy visual content. The identifier may be associated with the proxy visual content via the API. The identifier may include any identifier that may be associated with the proxy visual content and the visual content stored on the client computing platform such that the visual content and/or proxy visual content may not be confused for another visual content and/or proxy visual content stored by the server(s) and/or the client computing platform. The identifier component may be configured to effectuate transmission of the identifier to the client computing platform. The system may transmit the identifier to the client computing platform via the API, and/or via other mechanisms. The identifier may be associated with the visual content stored on the client computing platform.

The system may associate a task with the proxy visual content via the API. The task may include a request to determine and/or recommend edits to be made to the visual content stored on the client computing platform, and/or other operations or processing. The task may include the identifier associated with the proxy visual content. The system may effectuate transmission of the task from the API to a queue. The queue may manage one or more tasks to be processed by the remote computing platform. The system may queue the task at the queue until a remote computing platform is available to receive the task. The system may effectuate transmission of the task to the remote computing platform when the remote computing platform is available to receive the task.

The edits component may be configured to determine edits, at the remote computing platform, to the visual content based upon the proxy visual content. Upon receiving the task, the remote computing platform may determine edits to the visual content based upon the proxy visual content including one or more of an angle to rotate the visual content and an area to crop the visual content. For example, a device which captured the visual content may have been tilted at the time of capturing the visual content. As such, content and/or objects captured in the visual content may appear to be tilted. The remote computing platform may determine an angle to rotate the visual content based upon the proxy visual content such that the content and/or objects captured in the visual content appear level. The remote computing platform may determine an area to crop the visual content. Visual content cropping may refer to removing outer parts of visual content to improve framing, accentuate content captured in the visual content, and/or change an aspect ratio associated with the visual content. While rotating and/or cropping have been discussed as edits that may be determined by the remote computing platform to apply to the visual content based upon the proxy visual content, the edits component may be configured to determine other edits based upon visual content manipulation processes to the visual content based upon the proxy visual content including one or more of enhancing colors, lighting, and/or brightness, applying filters, and/or other edits based upon visual content manipulation processes. The edits component may be configured to determine classifications to associate with the visual content based upon object recognition within the proxy visual content. Individual classifications may be associated with a confidence score. The confidence score may quantify a likelihood of success for the object recognition.

The instructions component may be configured to effectuate transmission of instructions from the remote computing platform to the client computing platform. The instructions may include the identifier. The instructions may include the classifications to associate with the visual content (and/or the confidence score associated with the individual classifications). The instructions may be configured to cause client computing platform to process the edits on the visual content. The instructions component may be configured to effectuate transmission of instructions from the remote computing platform to the queue. The instructions component may effectuate transmission of the instructions from the queue to the API. Alternatively, the instructions component may be configured to effectuate transmission of the instructions directly from the remote computing platform to the API. In some embodiments, the instructions component may be configured to effectuate transmission of the instructions via a JavaScript Object Notation (JSON) data format. JSON representation of the instructions may include the identifier associated with the proxy visual content, the edits to be processed on the visual content, and/or the classifications to associate with the visual content. While a JSON data format may be used for transmission of the instructions, this is for exemplary purposes only. Any other data format and/or data interchange format may be used.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
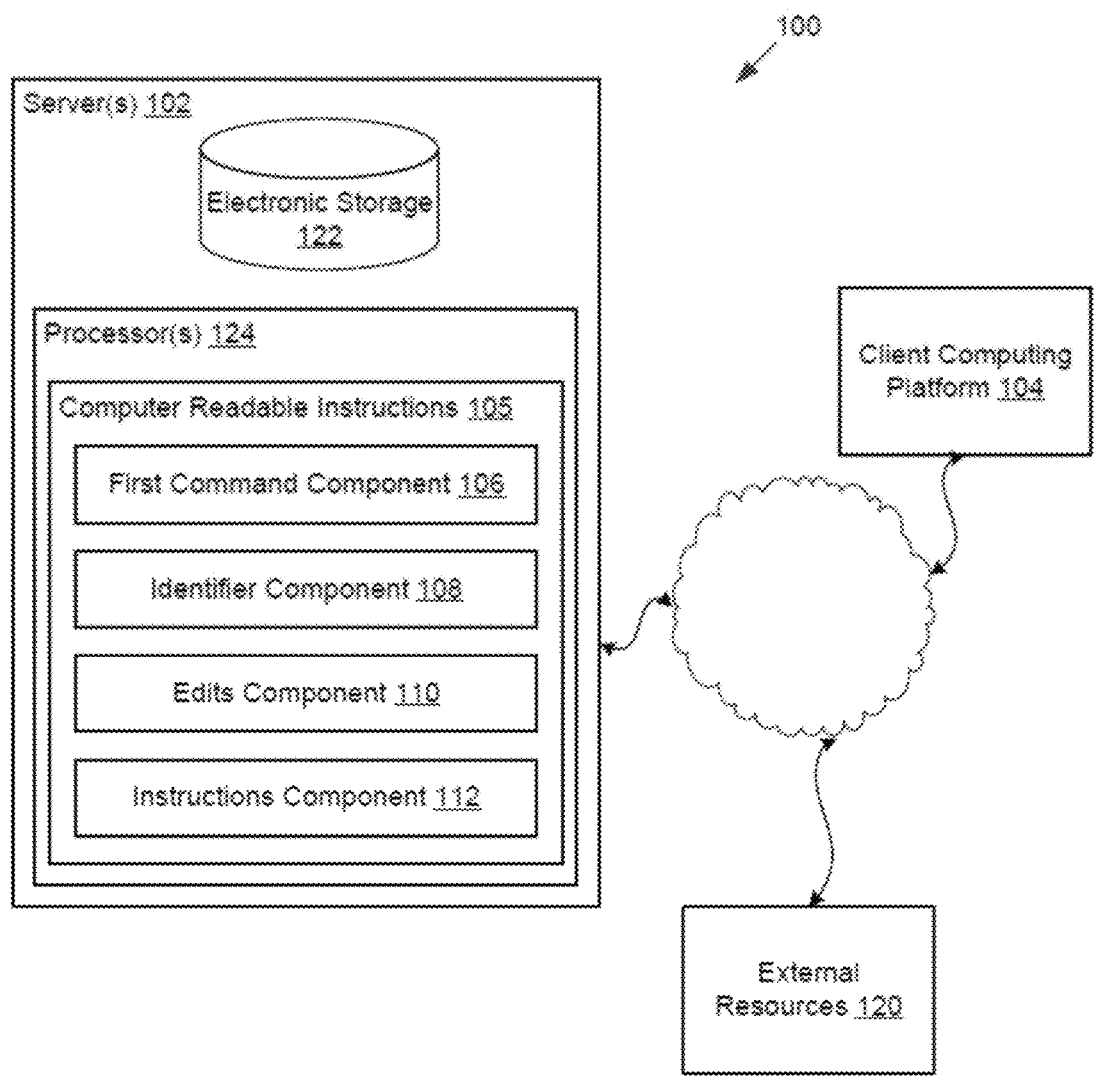
FIG. 1 illustrates a system that effectuates transmission of workflow between computing platforms, in accordance with one or more implementations.

FIG. 1 illustrates a system 100 that effectuates transmission of workflow between computing platforms, in accordance with one or more implementations. System 100 may receive, from a client computing platform, a first command. The first command may include a proxy image. The proxy image may represent an image stored on the client computing platform. The proxy image may be associated with an identifier which may be transmitted from an application programming interface (API) to the client computing platform. A task may be associated with the proxy image. The task may be transmitted from the API to a remote computing platform for processing based upon the proxy image. Processing may include determining edits to the image based upon the proxy image, including an angle to rotate the image and/or determining an area to crop the image. Instructions including the edits may be transmitted from the remote computing platform to client computing platform via the API, such that the instructions may be applied to the image at the client computing platform.

In some implementations, system 100 may include one or more servers 102. Server(s) 102 may be configured to communicate with one or more client computing platforms (e.g., client computing platform 104) according to a client/server architecture. The users of system 100 may access system 100 via client computing platform 104. Server(s) 102 may be configured to execute computer readable instructions 105. Computer readable instructions 105 may include one or more of first command component 106, identifier component 108, edits component 110, instructions component 112, and/or other components.

Figure 2:
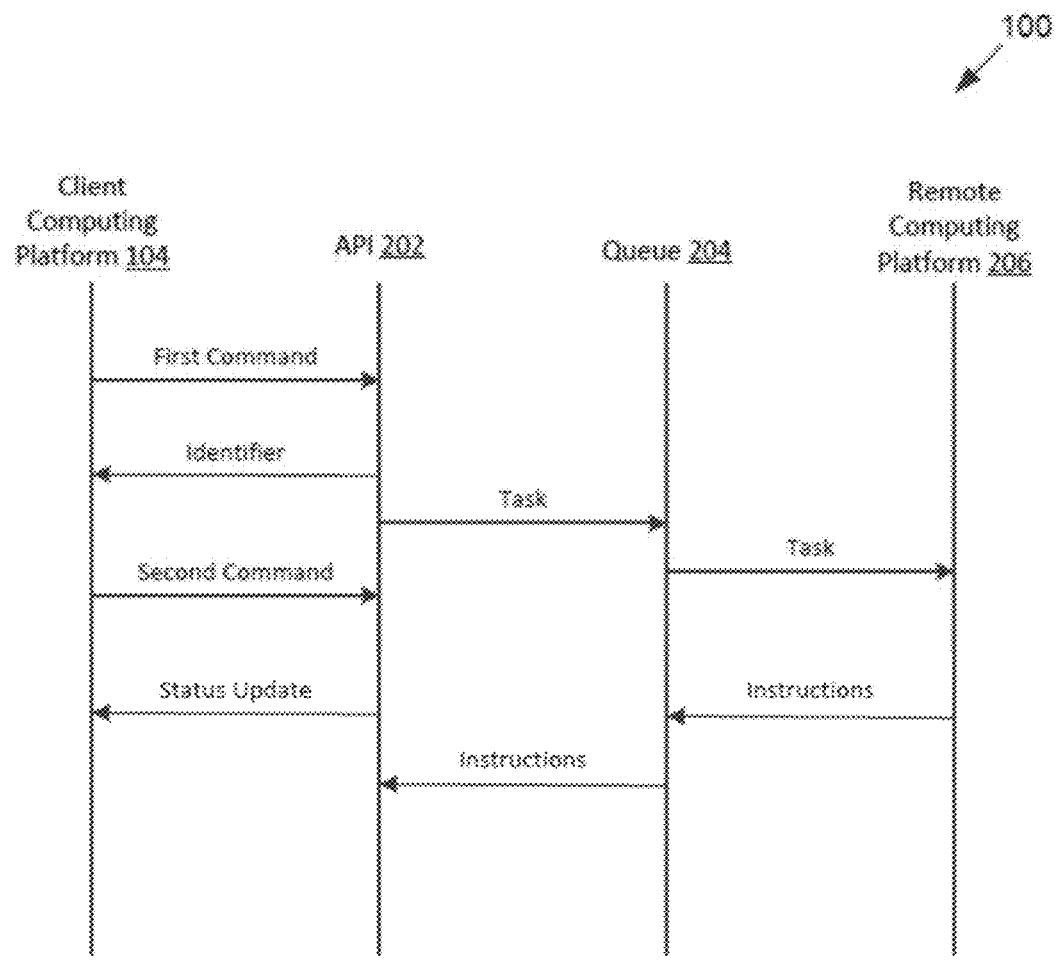
FIG. 2 illustrates an exemplary flowchart of workflow between computing platforms, in accordance with one or more implementations.

Referring to FIGS. 1 and 2, first command component 106 may be configured to receive a first command from a client computing platform. The first command may be received from client computing platform 104. The first command may include a proxy image. The proxy image may represent an image stored on client computing platform 104. Client computing platform 104 may include one or more of a cellular telephone, a smartphone, a digital camera, a laptop, a tablet computer, a desktop computer, a television set-top box, a smart TV, a gaming console, and/or other client computing platforms. The proxy image may be stored by server(s) 102, client computing platform 104, and/or other storage locations. The proxy image may be a downsample of the image stored on client computing platform 104, such that the proxy image may be a lower resolution image than the image stored on client computing platform 104, may include some but not all of the content in the proxy visual content, and/or be a proxy for the visual content stored on client computing platform 104 in other ways. The proxy image may be generated in such a way to maintain an aspect ratio in relation to the image stored on client computing platform 104.

The first command may include an upload of the proxy image via an application programming interface. Referring to FIG. 2, application programming interface (e.g., API 202), queue 204, and remote computing platform 206 may refer to functionalities of server(s) 102. API 202 may include functionalities similar to those of identifier component 108. API 202 may include a set of programming instructions and/or standards for accessing a web-based software application and/or a web-tool. API 202 may allow client computing platform 104 to interact with system 100 in a limited way based upon the programming instructions and/or standards of API 202. As shown in FIG. 2, API 202 may receive the first command including an upload of the proxy image from client computing platform 104. The proxy image may be stored by server(s) 102 and/or other storage locations.

Identifier component 108 may be configured to associate an identifier with the proxy image. The identifier may be associated with the proxy image via API 202. The identifier may include any identifier that may be associated with the proxy image and the image stored on client computing platform 104 such that the image and/or proxy image may not be confused for another image and/or proxy image stored by server(s) 102 and/or client computing platform 104.

Identifier component 108 may be configured to effectuate transmission of the identifier to the client computing platform. System 100 may transmit the identifier to client computing platform 104 via API 202, and/or via other mechanisms. The identifier may be associated with the image stored on client computing platform 104.

System 100 may associate a task with the proxy image via API 202. The task may include a request to determine and/or recommend edits to be made to the image stored on client computing platform 104, and/or other operations or processing. The task may include the identifier associated with the proxy image. System 100 may effectuate transmission of the task from API 202 to a queue (e.g., queue 204). Queue 204 may manage one or more tasks to be processed by remote computing platform 206.

System 100 may include one or more remote computing platforms (e.g., remote computing platform 206). System 100 may queue the task at queue 204 until a remote computing platform 206 is available to receive the task. Remote computing platform 206 may be busy processing other tasks and/or jobs. Remote computing platform 206 may include functionalities similar to those of edits component 110 and/or instructions component 112.

System 100 may effectuate transmission of the task to remote computing platform 206 when remote computing platform 206 is available to receive the task. System 100 may receive a notification from remote computing platform 206 that it is available to receive and/or process the task. The task received by remote computing platform 206 may include the proxy image and/or the identifier associated with the proxy image.

Figure 3:
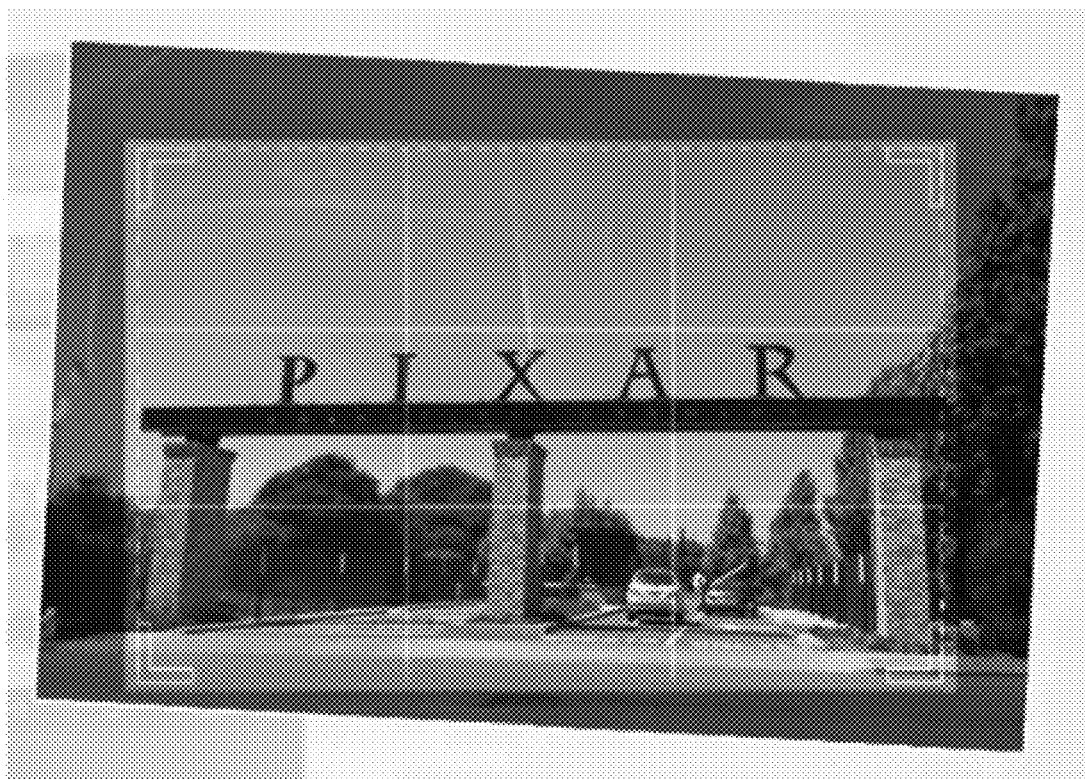
FIG. 3 illustrates an exemplary diagram of edits to an image, in accordance with one or more implementations.
Figure 4:
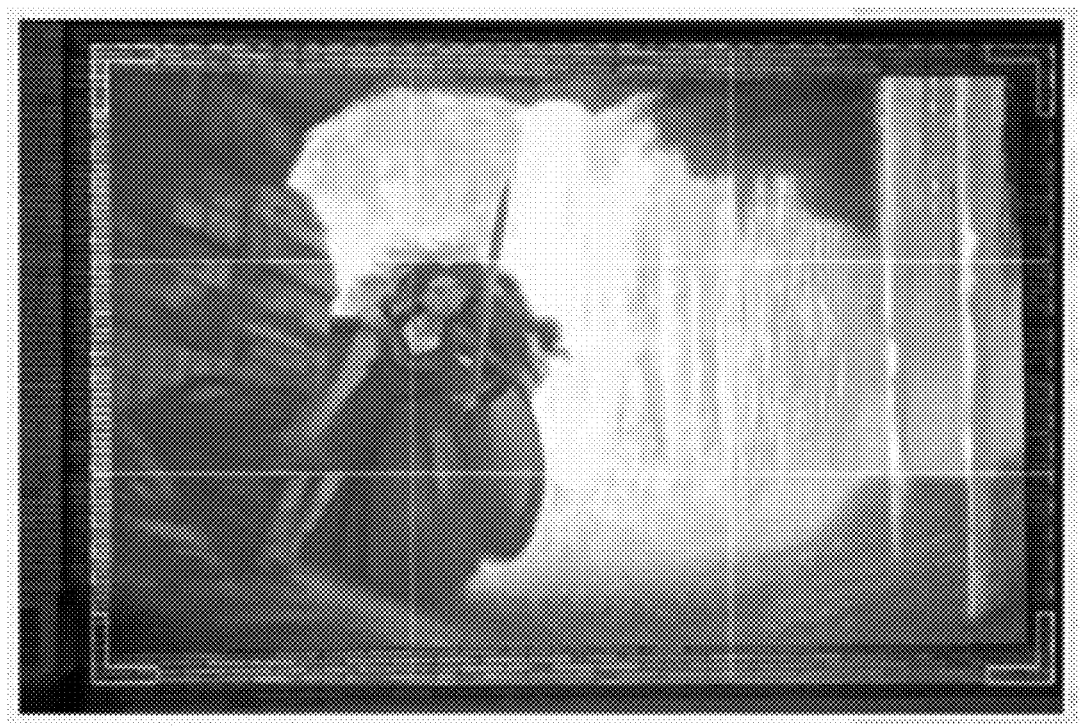
FIG. 4 illustrates an exemplary diagram of edits to an image, in accordance with one or more implementations.

Edits component 110 may be configured to determine edits, at remote computing platform 206, to the image based upon the proxy image. Upon receiving the task, remote computing platform 206 may determine edits to the image based upon the proxy image including one or more of an angle to rotate the image and an area to crop the image. For example, a device which captured the image may have been tilted at the time of capturing the image. As such, content and/or objects captured in the image may appear to be tilted. Referring to FIG. 3, remote computing platform 206 may determine an angle to rotate the image based upon the proxy image such that the content and/or objects captured in the image appear level. The angle to rotate the image may be represented by a number of degrees to rotate the image clockwise or counterclockwise. Referring to FIG. 4, remote computing platform 206 may determine an area to crop the image. Image cropping may refer to removing outer parts of an image to improve framing, accentuate content captured in the image, and/or change an aspect ratio associated with the image. If it is determined and/or recommended that the image be rotated by an angle and/or a number of degrees in a particular direction, it may be determined and/or recommended that the image be cropped in one or more areas such that the image may fit within particular dimensions. While rotating and/or cropping have been discussed as edits that may be determined by remote computing platform 206 to apply to the image based upon the proxy image, edits component 110 may be configured to determine other edits based upon image manipulation processes to the image based upon the proxy image including one or more of enhancing colors, lighting, and/or brightness, applying filters, and/or other edits based upon image manipulation processes.

Edits component 110 may be configured to determine classifications to associate with the image based upon object recognition within the proxy image. Many images may be stored on client computing platform 104. Various content and/or objects may be captured and/or depicted in various images. It may be beneficial to identify content and/or objects that have been captured and/or depicted within individual images. The identification of content and/or objects may be associated with classifications, which may include tags and/or labels associated with the individual images. Edits component 110 may be configured to determine such classifications based upon object recognition algorithms. For example, if the proxy image depicts a beach with sand, water, a bird, the sun, a volleyball net, and a volleyball, edits component 110 may be configured to determine classifications associated with the image (based upon the proxy image) including "beach", "ocean", "sun", "birds", "volleyball", "fun", and/or other classifications. Classifications associated with other images may be used to identify and/or determine classifications to be associated with the image. The classifications associated with the image may be used to search, group, organize, sort, and/or filter images.

Individual classifications may be associated with a confidence score. The confidence score may quantify a likelihood of success for the object recognition. A confidence score may be associated with individual classifications associated with the image. Continuing with the above example, if classifications associated with the image included "pool" and "ocean", a confidence score may be associated with "pool" and "ocean" based upon analysis of context of the image (e.g., based upon other objects depicted in the image) and/or analysis of the image in comparison to other images including similar content and/or objects. The classification of "pool" may be associated with a lower confidence score (e.g., 0.02) than the classification of "ocean" (e.g., 0.98) based upon "beach" having a confidence score of 0.99 and/or based upon previous classifications of other images including both "beach" and "ocean", rather than a combination of "beach" and "pool".

Instructions component 112 may be configured to effectuate transmission of instructions from remote computing platform 206 to client computing platform 104. The instructions may include the identifier. The instructions may include the classifications to associate with the image (and/or the confidence score associated with the individual classifications). The instructions may be configured to cause client computing platform 104 to process the edits on the image. Instructions component 112 may be configured to effectuate transmission of instructions from remote computing platform 206 to queue 204. Instructions component 112 may effectuate transmission of the instructions from queue 204 to API 202. Alternatively, instructions component 112 may be configured to effectuate transmission of the instructions directly from remote computing platform 206 to API 202. In some embodiments, instructions component 112 may be configured to effectuate transmission of the instructions via a JavaScript Object Notation (JSON) data format. JSON representation of the instructions may include the identifier associated with the proxy image, the edits to be processed on the image, and/or the classifications to associate with the image. While a JSON data format may be used for transmission of the instructions, this is for exemplary purposes only. Any other data format and/or data interchange format may be used.

System 100 may receive a second command at API 202. The second command may include the identifier associated with the image and/or proxy image. The second command may include a request for a status update regarding the task associated with the identifier. The status update may include one or more of whether the task associated with the identifier is still in queue 204 waiting for remote computing platform 206 to become available to process the task, an estimated wait time until remote computing platform 206 may be available to receive and/or process the task, whether the task associated with the identifier is currently being processed, an estimated time remaining to complete the task at remote computing platform 206, whether API 202 is waiting to receive the instructions from remote computing platform 206 and/or queue 204, an estimated wait time until the instructions may be received at API 202, and/or other status updates associated with the task and/or identifier. API 202 may store the instructions received from queue 204 and/or remote computing platform 206 until the second command is received at API 202. System 100 may effectuate transmission of the instructions to client computing platform 104 via API 202 in response to the second command. Alternatively, system 100 may automatically effectuate transmission of the instructions to client computing platform 104 via API 202 upon API 202 receiving the instructions from queue 204 and/or remote computing platform 206.

Upon receiving the instructions via API 202, client computing platform 104 may process the edits on the image associated with the identifier included within the instructions. Client computing platform 104 may receive the instructions including the edits to be made to the image (e.g., one or more of an angle to rotate the image, an area to crop the image, and/or other edits to the image) and the classifications to be associated with the image. Based upon the received instructions, client computing platform may process the edits and/or classifications on the image. For example, client computing platform 104 may rotate the image store on client computing device 104 associated with the identifier by the angle specified in the instructions. Client computing platform 104 may crop the image in the area specified in the instructions. Client computing platform 104 may associate some or all of the classifications (e.g., via tags and/or labels) with the image. Users of client computing platform 104 may search for other images with similar classifications associated with the image, organize images based upon one or more classifications associated with the image, filter images based upon one or more classifications associated with the image, sort images by classifications associated with the image, and/or group images together based upon the classifications associated with the image.

Referring again to FIG. 1, in some implementations, server(s) 102, client computing platform 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, and/or other components. The processor(s) 124 may be configured to execute components 106, 108, 110, 112, and/or other components by software; hardware; firmware; some combination of software, hardware, and/or firmware; and/or other mechanisms for configuring processing capabilities on processor(s) 124.

It should be appreciated that although components 106, 108, 110, and 112 are illustrated in FIG. 1 as being colocated within a single processing unit, in implementations in which processor(s) 124 includes multiple processing units, one or more of components 106, 108, 110, and/or 112 may be located remotely from the other components. The description of the functionality provided by the different components 106, 108, 110, and/or 112 described herein is for illustrative purposes, and is not intended to be limiting, as any of components 106, 108, 110, and/or 112 may provide more or less functionality than is described. For example, one or more of components 106, 108, 110, and/or 112 may be eliminated, and some or all of its functionality may be provided by other ones of components 106, 108, 110, and/or 112. As another example, processor(s) 124 may be configured to execute one or more additional components that may perform some or all of the functionality attributed herein to one of components 106, 108, 110, and/or 112.

Figure 5:
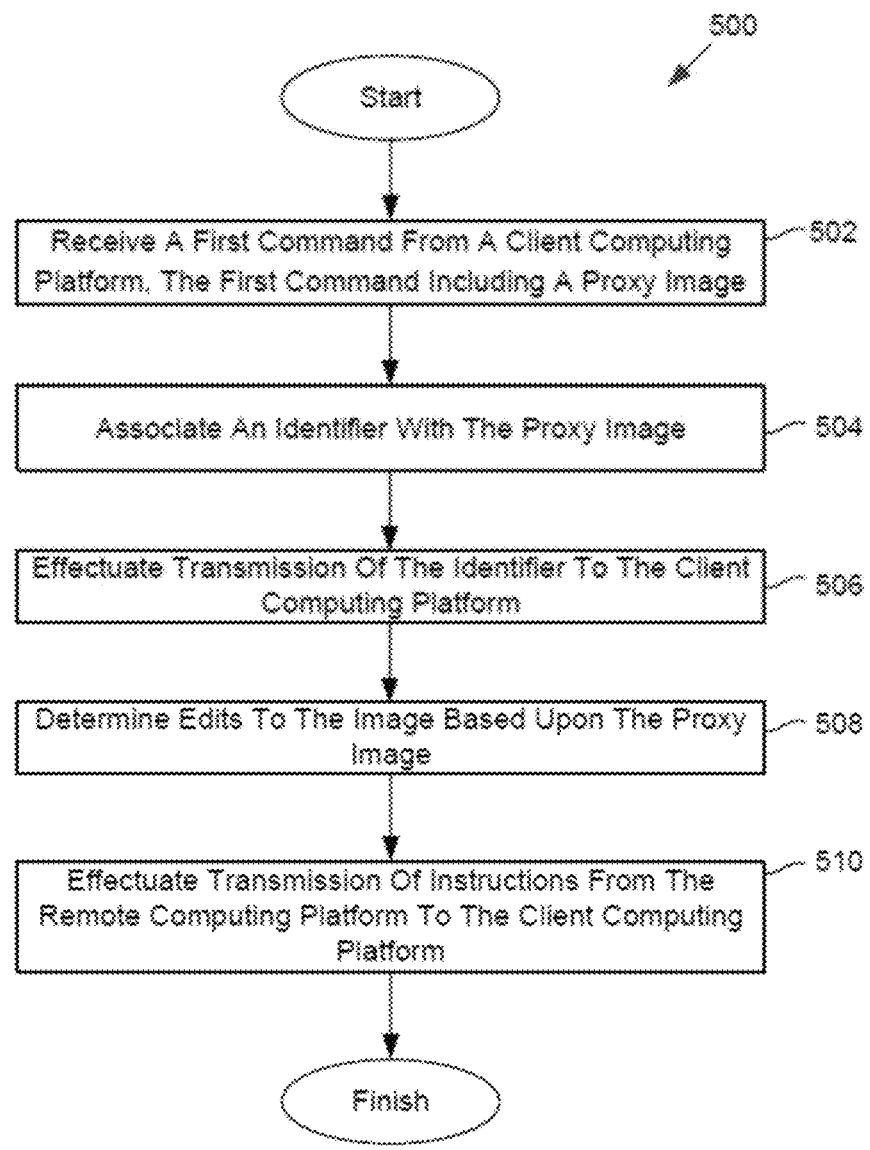
FIG. 5 illustrates a method that effectuates transmission of workflow between computing platforms, in accordance with one or more implementations.

FIG. 5 illustrates a method 500 that effectuates transmission of workflow between computing platforms, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a first command may be received from a client computing platform. The first command may include a proxy image. The proxy image may represent an image stored on the client computing platform. Operation 502 may be performed by a first command component that is the same as or similar to first command component 106, in accordance with one or more implementations.

At an operation 504, an identifier may be associated with the proxy image. At an operation 506, the identifier may be transmitted to the client computing platform. The identifier may be associated with the image stored on the client computing platform. Operations 504 and 506 may be performed by an identifier component that is the same as or similar to identifier component 108, in accordance with one or more implementations.

At an operation 508, edits to the image may be determined based upon the proxy image. The edits may be determined at a remote computing platform. Operation 508 may be performed by an edits component that is the same as or similar to edits component 110, in accordance with one or more implementations.

At an operation 510, instructions may be transmitted from the remote computing platform to the client computing platform. The instructions may include the identifier and may be configured to cause the client computing platform to process the edits on the image. Operation 510 may be performed by an instructions component that is the same as or similar to instructions component 112, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to effectuate transmission of workflow between computing platforms, the system comprising:
   one or more physical computer processors configured by computer readable instructions to:
      receive, from a client computing platform, a first command, the first command including a proxy image representing a lower resolution version of an image stored on the client computing platform;
      associate an identifier with the proxy image;
      effectuate transmission of the identifier to the client computing platform, the identifier to be associated with the image stored on the client computing platform;
      determine edits, at a remote computing platform, to the image based on the proxy image;
      effectuate transmission of instructions from the remote computing platform to the client computing platform, the instructions including the identifier and causing the client computing platform to process the edits on the image; and
      determine classifications of the image based on one or more objects recognized within the proxy image.

2. The system of claim 1, wherein the proxy image is a downsample of the image.

3. The system of claim 1, wherein the first command includes uploading the proxy image to a storage location.

4. The system of claim 3, wherein the one or more physical processors are further configured by computer-readable instructions to:
   associate a task with the proxy image including a request to determine the edits.

5. The system of claim 4, wherein the one or more physical processors are further configured by computer-readable instructions to:
   queue the task until the remote computing platform is available to receive the task.

6. The system of claim 4, wherein the one or more physical processors are further configured by computer-readable instructions to:
   effectuate transmission of the task to the remote computing platform when the remote computing platform is available to receive the task.

7. The system of claim 1, wherein the edits include an angle to rotate the image and/or an area to crop the image.

8. The system of claim 1, wherein the edits include one or more of enhancing colors, enhancing lighting, enhancing brightness, or applying filters.

9. The system of claim 1, wherein individual classifications are associated with individual confidence scores, the individual confidence scores quantifying individual likelihoods of success for recognizing the one or more objects.

10. The system of claim 1, wherein the instructions include the classifications to associate with the image.

11. A method to effectuate transmission of workflow between computing platforms, the method comprising:
   receiving, from a client computing platform, a first command, the first command including a proxy image representing a lower resolution version of an image stored on the client computing platform;
   associating an identifier with the proxy image;
   effectuating transmission of the identifier to the client computing platform, the identifier to be associated with the image stored on the client computing platform;
   determining edits, at a remote computing platform, to the image based on the proxy image; and
   effectuating transmission of instructions from the remote computing platform to the client computing platform, the instructions including the identifier and causing the client computing platform to process the edits on the image; and
   determining classifications of the image based one or more objects recognized within the proxy image.

12. The method of claim 11, wherein the proxy image is a downsample of the image.

13. The method of claim 11, wherein the first command includes uploading the proxy image to a storage location content via an application programming interface.

14. The method of claim 13, further comprising:
   associating a task with the proxy image including a request to determine the edits.

15. The method of claim 14, further comprising:
   queuing the task until the remote computing platform is available to receive the task.

16. The method of claim 14, further comprising:
   effectuating transmission of the task to the remote computing platform when the remote computing platform is available to receive the task.

17. The method of claim 11, wherein the edits include an angle to rotate the image and/or an area to crop the image.

18. The method of claim 11, wherein the edits include one or more of enhancing colors, enhancing lighting, enhancing brightness, or applying filters.

19. The method of claim 11, wherein individual classifications are associated with individual confidence scores, the individual confidence scores quantifying individual likelihoods of success for recognizing the one or more objects.

20. The method of claim 11, further comprising including the classifications to associate with the image within computer-readable instructions.

* * * * *